United States Patent
Tagaya

(10) Patent No.: US 11,218,620 B2
(45) Date of Patent: Jan. 4, 2022

(54) IMAGING APPARATUS

(71) Applicant: CANON KABUSHIKI KAISHA, Tokyo (JP)

(72) Inventor: Akira Tagaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/180,566

(22) Filed: Feb. 19, 2021

(65) Prior Publication Data

US 2021/0266429 A1 Aug. 26, 2021

(30) Foreign Application Priority Data

Feb. 26, 2020 (JP) .............................. JP2020-030784
Nov. 26, 2020 (JP) .............................. JP2020-196422

(51) Int. Cl.
*H04N 5/225* (2006.01)
*H04N 5/232* (2006.01)

(52) U.S. Cl.
CPC ....... *H04N 5/2252* (2013.01); *H04N 5/23206* (2013.01); *H04N 5/23287* (2013.01); *H04N 5/23299* (2018.08)

(58) Field of Classification Search
CPC ............. H04N 5/2252; H04N 5/23299; H04N 5/23287; H04N 5/23206; H04N 5/2253; H04N 5/247; H04N 5/2251; G02B 27/0006; G02B 27/023; G08G 1/14; G08G 1/142
USPC ......................................................... 348/373
See application file for complete search history.

(56) References Cited

U.S. PATENT DOCUMENTS

| | | | | |
|---|---|---|---|---|
| 8,164,686 B2* | 4/2012 | Togawa | ............. | G08B 13/1963 348/373 |
| 8,251,596 B2* | 8/2012 | Sasaki | ..................... | G03B 17/00 396/427 |
| 9,195,118 B2* | 11/2015 | Okamura | ............... | G03B 15/16 |
| 9,635,225 B2* | 4/2017 | Okamura | ............. | H04N 5/2254 |
| 9,645,393 B2* | 5/2017 | Okamura | ............... | G02B 7/023 |
| 9,699,359 B2* | 7/2017 | Urano | ................... | H04N 5/2256 |
| 9,716,816 B2* | 7/2017 | Urano | ................... | H04N 5/2252 |
| 10,721,400 B2* | 7/2020 | Fang | ..................... | H04N 5/225 |
| 10,798,273 B2* | 10/2020 | Song | .................. | H04N 5/23299 |
| 10,845,675 B2* | 11/2020 | Lim | ....................... | G03B 17/55 |
| 10,901,304 B2* | 1/2021 | Sasaki | .................. | G03B 17/561 |
| 2003/0103160 A1* | 6/2003 | Tatewaki | ........... | G08B 13/1963 348/375 |

(Continued)

FOREIGN PATENT DOCUMENTS

| | | |
|---|---|---|
| EP | 3561591 A1 | 10/2019 |
| JP | 2018036599 A | 3/2018 |
| JP | 2019033406 A | 2/2019 |

*Primary Examiner* — Pritham D Prabhakher
(74) *Attorney, Agent, or Firm* — Canon U.S.A., Inc. I.P. Division

(57) ABSTRACT

An imaging apparatus includes a casing including a base unit and a cover unit, a camera unit disposed on the base unit in the casing, a camera cover disposed on the base unit in the casing and being in contact with and covering the camera unit, and a biasing member configured to bias the camera cover and to be deformed by being pressed by the cover unit when the cover unit is attached to the base unit. A frictional force between the camera unit and the camera cover increases due to an increase in a biasing force applied from the biasing member to the camera cover according to the deformation of the biasing member.

14 Claims, 8 Drawing Sheets

(56) References Cited

U.S. PATENT DOCUMENTS

| | | | |
|---|---|---|---|
| 2011/0033179 A1* | 2/2011 | Sasaki | G03B 17/00 |
| | | | 396/427 |
| 2016/0085069 A1 | 3/2016 | Okamura | |
| 2016/0088199 A1* | 3/2016 | Okamura | H04N 5/2254 |
| | | | 348/374 |
| 2016/0255251 A1* | 9/2016 | Urano | G02B 7/023 |
| | | | 348/143 |
| 2016/0255255 A1* | 9/2016 | Urano | H04N 5/33 |
| | | | 348/164 |
| 2019/0265760 A1* | 8/2019 | Jan | G03B 17/561 |
| 2019/0297231 A1 | 9/2019 | Song | |
| 2020/0033698 A1* | 1/2020 | Lim | G03B 17/08 |

* cited by examiner

IMAGING APPARATUS

BACKGROUND OF THE INVENTION

Field of the Invention

The present invention relates to an imaging apparatus.

Description of the Related Art

Conventionally, network cameras have been assumed to be installed under various environments. For example, assuming that such a network camera is installed on a vehicle, a strong vibration or impact may be transmitted to a camera casing. On the other hand, when the camera casing is installed on the vehicle, the orientation of a camera unit should be manually adjusted and set so as to match an arbitrary imaging direction. A holding torque for fixing the camera unit should be increased to prevent the imaging direction from being displaced due to the strong vibration or the like after adjusting the orientation. However, when the camera unit is manually moved in such a manner that the imaging direction thereof matches the desired direction, the increase in the holding torque causes an undesirable reduction in the workability.

Therefore, conventionally, there have been employed a method of preparing a dedicated adjustment tool and allowing the camera unit to be moved even under the strong holding torque, and a method of fixing the camera unit using a screw or the like after adjusting the orientation. However, the necessity of the dedicated adjustment tool inconveniently leads to an increase in the number of components enclosed in the product and also leads to an increase in the number of work processes. Further, the provision of a screw fixation portion in the casing may result in an undesirable increase in the size of the casing. Generally, it is desirable that the work of installing the camera can be achieved with a small number of processes and a small number of dedicated tools. Further, the size reduction is demanded so as to allow the camera to be installed at even a hidden place or a place where space is restricted, e.g. a narrow place.

Under these circumstances, an imaging apparatus discussed in Japanese Patent Application Laid-Open No. 2018-36599 includes a fixation member disposed on a camera unit, wherein the camera unit is fixed by the fixation member being brought into contact with a dome cover and sandwiched when a top cover is closed.

However, the imaging apparatus discussed in Japanese Patent Application Laid-Open No. 2018-36599 causes the fixation member to directly contact the camera unit, thereby raising a possibility that the angle of view is accidentally displaced when the top cover is closed. Especially in a case of a high magnification lens, even a slight displacement of the angle of view results in an undesirable significant displacement of the imaging range.

SUMMARY OF THE INVENTION

The present invention is directed to providing an imaging apparatus capable of improving workability of an adjustment of an imaging direction by a user and also preventing a change in the imaging direction of a camera unit due to a vibration.

According to an aspect of the present invention, an imaging apparatus includes a casing including a base unit and a cover unit, a camera unit disposed on the base unit in the casing, a camera cover disposed on the base unit in the casing, the camera cover being in contact with and covering the camera unit, and a biasing member configured to bias the camera cover and to be deformed by being pressed by the cover unit when the cover unit is attached to the base unit. A frictional force between the camera unit and the camera cover increases due to an increase in a biasing force applied from the biasing member to the camera cover according to the deformation of the biasing member.

Further features of the present invention will become apparent from the following description of exemplary embodiments (with reference to the attached drawings).

DESCRIPTION OF THE EMBODIMENTS

Figure 1:
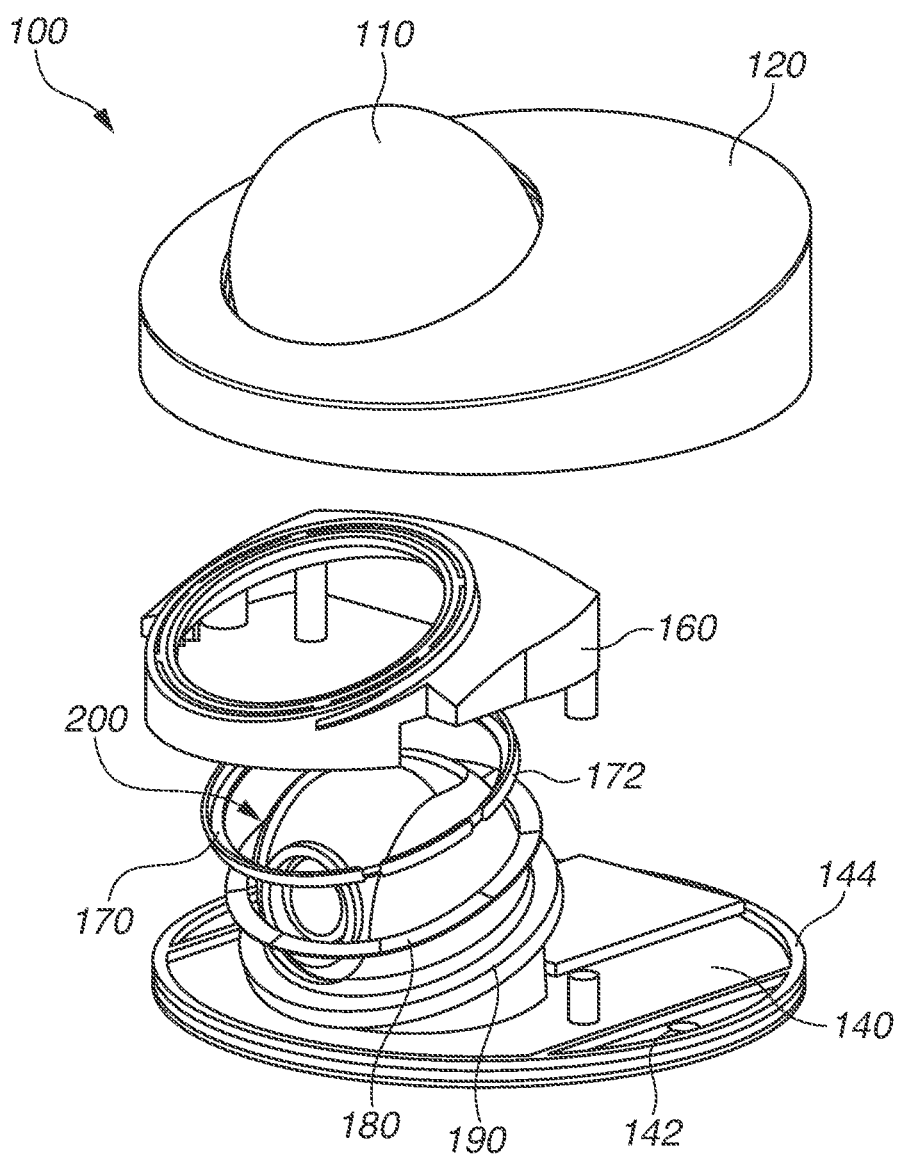
FIG. 1 is an exploded perspective view of an imaging apparatus according to a first exemplary embodiment of the present invention.
Figure 2:
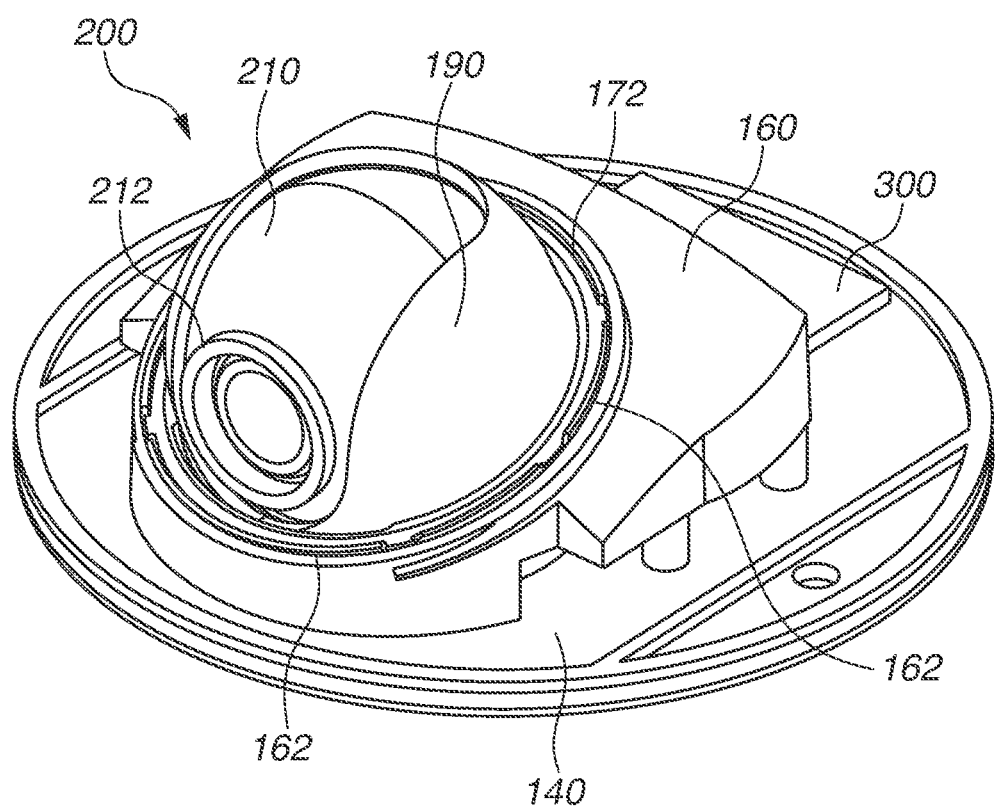
FIG. 2 illustrates the imaging apparatus according to the first exemplary embodiment of the present invention with a top cover thereof removed therefrom.
Figure 3:
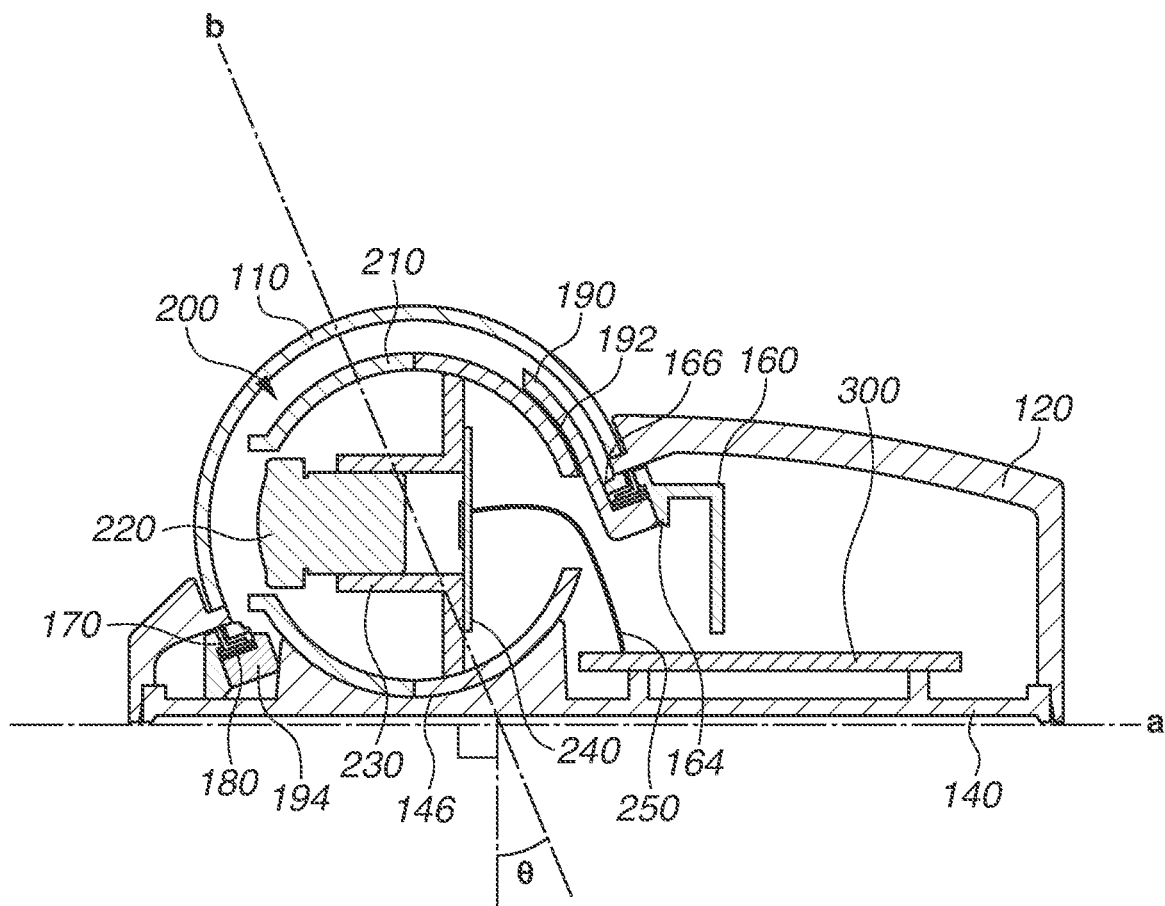
FIG. 3 is a cross-sectional view illustrating the detailed configuration of the imaging apparatus according to the first exemplary embodiment of the present invention.

In the following description, exemplary embodiments of the present invention will be described with reference to the drawings. The present exemplary embodiments will be described, citing a network camera as an example of an imaging apparatus. FIG. 1 is an exploded perspective view of an imaging apparatus according to a first exemplary embodiment of the present invention. FIG. 2 illustrates the imaging apparatus according to the first exemplary embodiment of the present invention with a top cover thereof removed therefrom. FIG. 3 is a cross-sectional view illustrating the detailed configuration of the imaging apparatus according to the first exemplary embodiment of the present invention.

A network camera 100 includes a lens protection member 110, a top cover 120 (a cover unit), a bottom cover 140 (a base unit), a base member 160 (a holding member), a pressing member 170, an elastic member 180 (a biasing member), a cover member 190 (a camera cover), and a substantially spherical camera unit 200.

The lens protection member 110 is semi-spherical, and protects components housed inside a casing from impacts and the like. Because the network camera 100 captures an image via the protection lens member 110 at the time of imaging, the protection lens member 110 is handled as an optical component, and transparency and dimensional precision are important therefor. Further, the lens protection member 110 is made from, for example, transparent polycarbonate. The lens protection member 110 is fixed to the top cover 120 using a screw or the like, and is fixed to the bottom cover 140 in the state fixed to the top cover 120.

The top cover 120 and the bottom cover 140 form the casing by being fastened to each other using a screw or the like. The base member 160, the pressing member 170, the elastic member 180, the cover member 190, and the camera unit 200 are disposed inside the casing. Further, a control board 300 is contained inside the casing. The control board 300 controls the entire network camera 100, such as power supply, camera control, and a connection to a network.

The top cover 120 and the bottom cover 140 are made from, for example, die-cast metal and polycarbonate resin. An installation hole is provided to the bottom cover 140, and the bottom cover 140 is fixed to, for example, a ceiling or a wall of a vehicle using a screw or the like. Further, the bottom cover 140 is equipped with a waterproof portion, and prevents water and dust from entering inside the casing by the fixation of the top cover 120 thereto.

The base member 160 holds the cover member 190 rotatably in a pan direction, and is fixed to the bottom cover 140 using a screw or the like. The base member 160 is provided with a circular opening in which the camera unit 200 is arranged, and is at least partially disposed between the top cover 120 and the pressing member 170. The base member 160 is made from, for example, polycarbonate resin. A protrusion hole 162, through which a protrusion portion 172 of the pressing member 170 is inserted, is formed on the base member 160. A plurality of the protrusion holes 162 is circularly provided at intervals. As illustrated in FIG. 2, with the top cover 120 removed, the protrusion portions 172 of the pressing member 170 are inserted through the protrusion holes 162 of the base member 160, and are fixed in protruding states.

Further, as illustrated in FIG. 3, the base member 160 includes a first cylindrical holding portion 164, which pannably rotatably holds the cover member 190, and a second cylindrical holding portion 166. The first cylindrical holding portion 164 regulates pan rotations of the camera unit 200 and the cover member 190, and the second cylindrical holding portion 166 prevents the cover member 190 from falling down. A pan axis b, which is the center of the rotation in the pan direction that is defined by the first cylindrical holding portion 164, is arranged at a predetermined angle θ with respect to a direction perpendicular to a surface a on which the bottom cover 140 is installed, as illustrated in FIG. 3.

The pressing member 170 is a member that presses the elastic member 180, and is substantially circular. The camera unit 200 is disposed in the pressing member 170. The pressing member 170 is made from a sheet metal such as stainless steel. The pressing member 170 is at least partially disposed between the base member 160 and the elastic member 180. Further, the pressing member 170 includes the protrusion portion 172 protruding in a direction toward the top cover 120. The protrusion portion 172 extends along the circumferential direction, and a plurality of the protrusion portions 172 is provided at even intervals. The protrusion portions 172 are disposed so as to be inserted through the protrusion holes 162 of the base member 160 with the top cover 120 removed. Further, the distal ends of the protrusion portions 172 are chamfered so as to facilitate the insertion through the protrusion holes 162. The pressing member 170 includes the plurality of protrusion portions 172 arranged at the even intervals, but may include the protrusion portions 172 arranged at uneven intervals or may include only one protrusion portion 172. Having said that, the pressing member 170 may be omitted. In the case where the pressing member 170 is omitted, the elastic member 180 is configured to be directly pressed by the top cover 120.

The elastic member 180 is a member that biases the cover member 190, and is substantially circular. The camera unit 200 is disposed in the elastic member 180. The elastic member 180 is made from a wave washer. The elastic member 180 is disposed between the pressing member 170 and the cover member 190, and is compressed by being pressed by the pressing member 170. More specifically, the elastic member 180 is deformed by being pressed by the pressing member 170 and biases the cover member 190, when the top cover 120 is attached to the bottom cover 140. Further, a frictional force between the camera unit 200 and the cover member 190 increases due to an increase in the biasing force applied from the elastic member 180 to the cover member 190 according to the deformation of the elastic member 180. This will be described below.

The cover member 190 includes an opening portion opened continuously from a horizontal position to a vertical position corresponding to an imaging range. The cover member 190 is made from, for example, polycarbonate resin.

The cover member 190 includes a flange portion 194 held by the first cylindrical holding portion 164. The flange portion 194 is arranged in a plane substantially perpendicular to the pan-axis direction. Then, the elastic member 180 is disposed on the flange portion 194. This means that the elastic member 180 is compressed in a direction substantially in parallel with the pan axis b. A vibration transmitted from the vehicle or the like to the camera basically contains a great vibration component of the direction perpendicular to the installation surface a. On the other hand, the elastic member 180 is configured to be compressed in the direction at the predetermined inclination angle θ with respect to the direction perpendicular to the installation surface a, and a difference is made between the vibration direction and the direction in which the elastic member 180 is compressed. This contributes to distribution of a stress of the vibration component of the perpendicular direction and thus a reduction therein. As a result, the network camera 100 prevents the angle of view from being displaced due to the extension/compression of the elastic member 180 in reaction to a strong vibration and an unintentional reduction in the frictional force.

The camera unit 200 is configured to be rotatable in the pan direction, a tilt direction, and a rotation direction by a user holding the camera unit 200 or the cover member 190 and manually rotationally operating it. The pan rotation operation causes the cover member 190 and the camera unit 200 to rotate together (integrally) relative to the base member 160 by rotationally panning any of the cover member 190 and the camera unit 200. On the other hand, the tilt and rotation operations may cause only the camera unit 200 to rotate relative to the cover member 190 without causing the cover member 190 to rotate. A circular rib 212 is formed on a lens cover 210 of the camera unit 200 as illustrated in FIG. 2, and the tilt rotation of the camera unit 200 is regulated by the cover member rib 212 contacting the edge of the opening portion of the cover member 190.

The camera unit 200 is disposed in a substantially spherical first reception portion 146 of the cover member bottom cover 140, and is held so as to be covered by the cover member 190 from above. Further, the camera unit 200 includes a lens 220, a lens holder 230, an imaging board 240 including an image sensor, and the lens cover 210. The lens holder 230 and the lens cover 210 are made from, for example, polycarbonate resin.

The lens 220 is threadably held by the lens holder 230, which allows the position thereof to be adjusted in the optical-axis direction for a focus adjustment. The imaging board 240 is fixed to the lens holder 230 by adhesion or the like. Then, the lens holder 230 is held and fixed on the lens cover 210. An opening portion for exposing the lens 220 is formed on the front side of the lens cover 210, and a hole for insertion of a wire 250 or the like is formed on the rear side of the lens cover 210. The imaging board 240 is electrically connected to the control board 300 via the wire 250 or the like. Due to this connection, the camera unit 200 converts light received via the lens protection member 110 and the lens 220 into an electric signal by the imaging board 240, and, for example, records a video image or delivers it to the network via the control board 300.

Now, the frictional force for fixing the camera unit 200 will be described. The substantially spherical first reception portion 146, which holds the lower side of the lens cover 210, is formed on the bottom cover 140. A substantially spherical second reception portion 192, which holds the upper side of the lens cover 210, is formed on the cover member 190. The lens cover 210, and the first reception portion 146 and the second reception portion 192 are in contact with each other on a substantially spherical surface, which allows the camera unit 200 to rotate in the tilt and rotation directions around the spherical center of the lens cover 210. The base member 160 presses the cover member 190 against the lens cover 210 by pressing the elastic member 180 via the pressing member 170. As a result, a frictional force is generated between the lens cover 210, and the first reception portion 146 and the second reception portion 192. A pan/tilt/rotation holding torque (holding force) is generated due to this frictional force. Further, the frictional force between the lens cover 210 and the second reception portion 192 of the cover member 190 is greater after the top cover 120 is attached to the bottom cover 140 than before the top cover 120 is attached to the bottom cover 140. Similarly, the frictional force between the lens cover 210 and the first reception portion 146 of the bottom cover 140 is greater after the top cover 120 is attached to the bottom cover 140 than before the top cover 120 is attached to the bottom cover 140.

In this manner, the lens cover 210, and the first reception portion 146 and the second reception portion 192 are constantly in contact with each other. However, the frictional force between the lens cover 210, and the first reception portion 146 and the second reception portion 192 is different between before the top cover 120 is attached to the bottom cover 140 and after the top cover 120 is attached to the bottom cover 140.

Figure 4A:
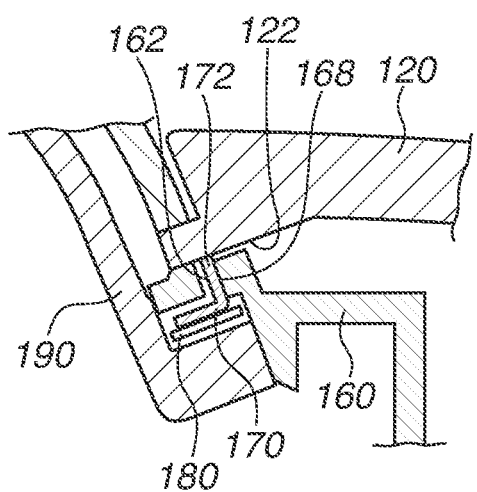
FIGS. 4A to 4D are cross-sectional views illustrating the details of the operation of a pressing member according to the first exemplary embodiment of the present invention.

Further, the pan/tilt/rotation holding torque (holding force) of the camera unit 200 will be described in detail. FIGS. 4A to 4D are cross-sectional views illustrating the details of the operation of the pressing member 170. FIGS. 4A and 4C each illustrate the position of the pressing member 170 with the top cover 120 closed. A difference between FIGS. 4A and 4C is a difference in the cross-sectional position. FIG. 4A illustrates the portion where the elastic member 180 and the cover member 190 are out of contact with each other, and FIG. 4C illustrates the portion where the elastic member 180 and the cover member 190 are in contact with each other. Since the elastic member 180 is a wave washer, some portion is out of contact as illustrated in FIG. 4A depending on the cross-sectional position.

A guide portion 168, which regulates the movement of the pressing member 170, is formed on each of the outer peripheral surfaces of the protrusion holes 162 of the base member 160. The outer peripheral surface (the outer surface) of the pressing member 170 and the guide portion 168 are fitted to each other, which allows the pressing member 170 to move in the pan-axis direction. On the other hand, a clearance is generated between the inner peripheral wall surface of the protrusion hole 162 and the inner peripheral surface of the pressing member 170, which establishes a structure that does not impede the movement of the pressing member 170 in the pan-axis direction.

The top cover 120 includes a pressing surface 122 substantially perpendicular to the pan axis b, and the pressing surface 122 presses the protrusion portions 172 of the pressing member 170 with the top cover 120 closed. Due to this pressing, the pressing member 170 moves in a direction for compressing the elastic member 180 in the pan-axis direction. At this time, the elastic member 180 is brought into a maximumly compressed state in an elastic deformation region, and also maximizes the holding torque (the holding force) applied to the camera unit 200. With the holding torque (the holding force) maximized in this manner, the network camera 100 can prevent the camera unit 200 from being displaced in the pan/tilt/rotation direction and thus prevent a change in the angle of view of imaging even when a vibration or impact is transmitted to the network camera 100.

Figure 4B:
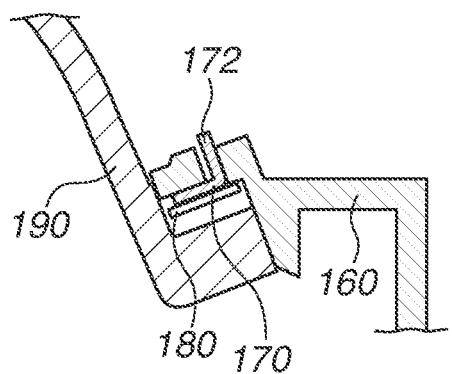
Figure 4C:
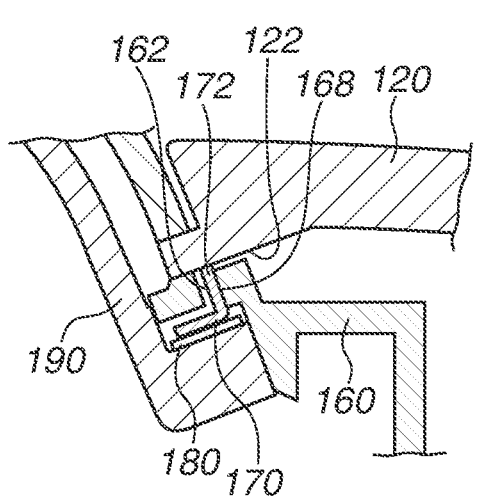
Figure 4D:
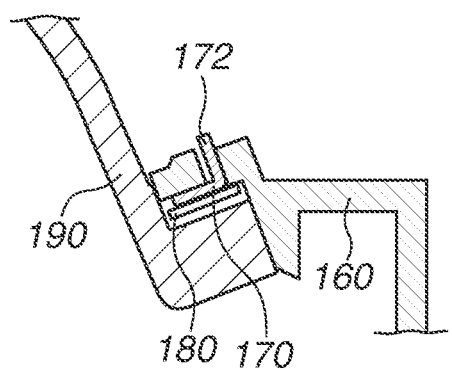

FIGS. 4B and 4D each illustrate the position of the pressing member 170 with the top cover 120 opened. A difference between FIGS. 4B and 4D is a difference in the cross-sectional position. FIG. 4B illustrates the portion where the elastic member 180 and the cover member 190 are out of contact with each other, and FIG. 4D illustrates the portion where the elastic member 180 and the cover member 190 are in contact with each other. Since the elastic member 180 is the wave washer, some portion is out of contact as illustrated in FIG. 4B depending on the cross-sectional position.

The user engages in work of adjusting the imaging direction in a state before the top cover 120 is attached in this manner. In the state before the top cover 120 is attached, the pressing member 170 moves toward the base member 160 side in the pan-axis direction due to a reaction force of the elastic member 180. At this time, the compression amount of the elastic member 180 reduces compared to the state at the time of FIGS. 4A and 4C, and the pan/tilt/rotation holding torque applied to the camera unit 200 also reduces. However, the elastic member 180 is mounted in the state compressed between the pressing member 170 and the cover member 190 at the time of the assembling. Therefore, the holding torque is generated. Due to this holding torque, the network camera 100 can allow the user to adjust the orientation of the camera unit 200 to an arbitrary orientation while preventing the camera unit 200 from unintentionally moving due to its own weight or the like. Further, the network camera 100 can maintain the angle of view after the user adjusts the orientation of the camera unit 200 to the arbitrary position.

In this manner, in the state before the top cover 120 is attached as illustrated in FIGS. 4B and 4D, i.e., at the time of the installation of the network camera 100, the pan/tilt/rotation holding torque is small and therefore the user can adjust the orientation of the camera unit 200 to the arbitrary orientation. Further, when the user attaches the top cover 120 as illustrated in FIGS. 4A and 4C after adjusting the orientation of the camera unit 200, the holding torque applied to the camera unit 200 is also maximized by this attachment. Therefore, even when a vibration or impact is transmitted to the network camera 100, the network camera 100 can prevent the camera unit 200 from being displaced in the pan/tilt/rotation direction and thus prevent a change in the angle of view of imaging. Further, the network camera 100 can prevent the angle of view from being unintentionally displaced when the top cover 120 is closed, compared to the configuration in which the camera unit 200 is directly biased by the elastic member.

In this manner, according to the first exemplary embodiment of the present invention, it is possible to provide the network camera 100 capable of improving the workability of the adjustment of the imaging direction by the user, and also preventing a change in the imaging direction of the camera unit due to a vibration.

Figure 5A:
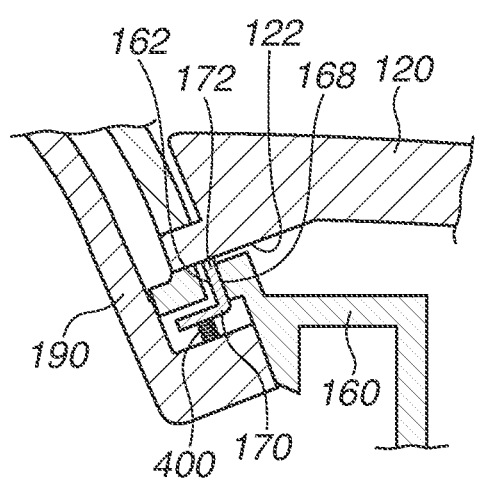
FIGS. 5A and 5B are cross-sectional views illustrating the details of the operation of a pressing member according to a second exemplary embodiment of the present invention.

Next, a second exemplary embodiment of the present invention will be described with reference to FIGS. 5A and 5B. The second exemplary embodiment is different from the first exemplary embodiment in terms of the elastic member. The basic configuration of the present exemplary embodiment is similar to the first exemplary embodiment, and therefore common constituent components will be identified by the same reference numerals as the first exemplary embodiment and this will be substituted for the descriptions thereof. An elastic member 400 according to the second exemplary embodiment is made of a coil spring. The elastic member 400 is a member that biases the cover member 190, and a plurality of the elastic members 400 is disposed at even intervals in the circumferential direction. The elastic members 400 are disposed between the pressing member 170 and the cover member 190, and are compressed by being pressed by the pressing member 170. One possible method for fixing the elastic members 400 is to fix them by providing protrusions to the pressing member 170 or the cover member 190, but the fixation method is not limited to this.

How the camera unit 200 is held will be described in detail. FIGS. 5A and 5B are cross-sectional views illustrating the details of the operation of the pressing member 170. FIG. 5A illustrates the position of the pressing member 170 with the top cover 120 closed. The pressing surface 122 presses the protrusion portions 172 of the pressing member 170 with the top cover 120 closed, similarly to the first exemplary embodiment. Due to this pressing, the pressing member 170 moves in a direction for compressing the elastic members 400 in the pan-axis direction. At this time, the elastic members 400 are brought into maximumly compressed states in the elastic deformation region, and also maximize the holding torque applied to the camera unit 200. With the holding torque maximized, the network camera 100 can prevent the camera unit 200 from being displaced in the pan/tilt/rotation direction and thus prevent a change in the angle of view of imaging even when a vibration or impact is transmitted to the network camera 100.

Figure 5B:
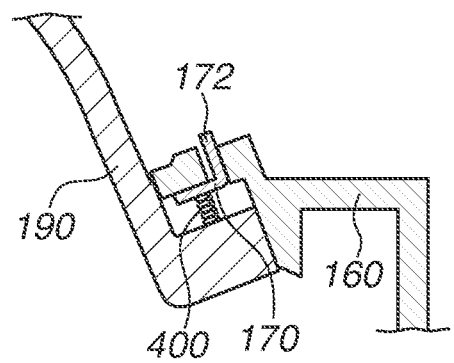

FIG. 5B illustrates the position of the pressing member 170 with the top cover 120 opened. With the top cover 120 opened, the pressing member 170 moves toward the base member 160 side in the pan-axis direction due to a reaction force of the elastic members 400. At this time, the compression amounts of the elastic members 400 reduce compared to FIG. 5A, and the holding torque applied to the camera unit 200 also reduces. However, the elastic members 400 are still held in a slightly compressed state, and therefore the holding torque never disappears. Due to this holding torque, the network camera 100 can allow the user to adjust the orientation of the camera unit 200 to an arbitrary orientation while preventing the camera unit 200 from unintentionally moving due to its own weight or the like. Further, the network camera 100 can maintain the angle of view after the user adjusts the orientation of the camera unit 200 to the arbitrary orientation.

In this manner, in the state before the top cover 120 is attached as illustrated in FIG. 5B, i.e., at the time of the installation of the network camera 100, the pan/tilt/rotation holding torque is small and therefore the user can adjust the orientation of the camera unit 200 to the arbitrary orientation. Further, when the user attaches the top cover 120 as illustrated in FIG. 5A after adjusting the orientation of the camera unit 200, the holding torque applied to the camera unit 200 is maximized by this attachment. Therefore, even when a vibration or impact is transmitted to the network camera 100, the network camera 100 can prevent the camera unit 200 from being displaced in the pan/tilt/rotation direction and thus prevent a change in the angle of view of imaging.

In this manner, according to the second exemplary embodiment of the present invention, it is possible to improve the workability of the adjustment of the imaging direction by the user at the time of the installation, similarly to the first exemplary embodiment. Further, it is possible to provide the network camera 100 capable of preventing a change in the imaging direction of the camera unit due to a vibration in use.

Figure 6A:
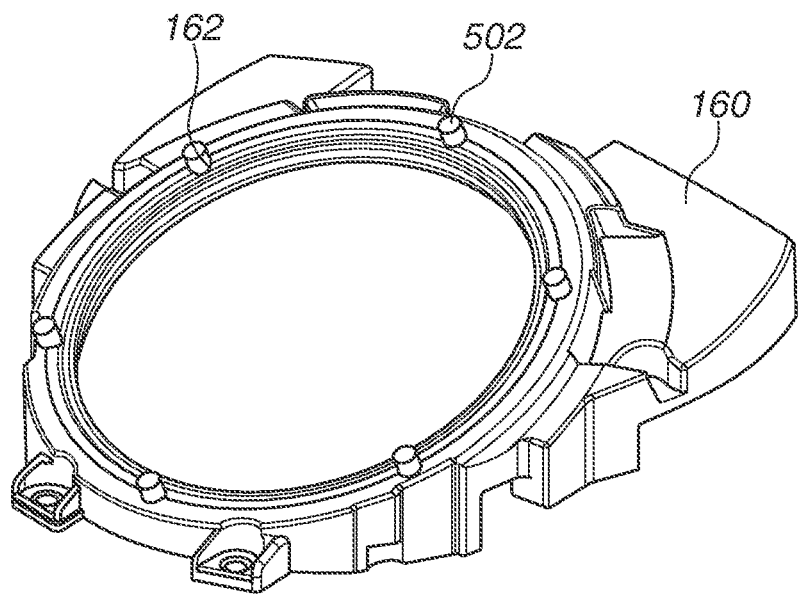
FIGS. 6A and 6B are perspective views illustrating a pressing member according to a third exemplary embodiment of the present invention.
Figure 6B:
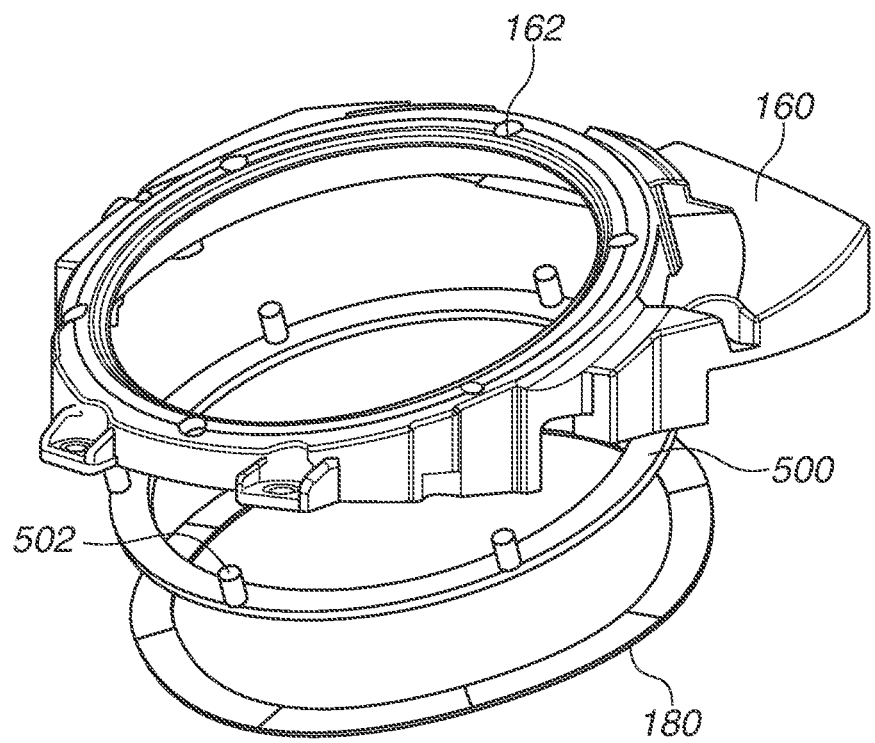

Next, a third exemplary embodiment of the present invention will be described with reference to FIGS. 6A and 6B. FIGS. 6A and 6B are perspective views illustrating a pressing member according to the third exemplary embodiment of the present invention. The third exemplary embodiment is different from the first exemplary embodiment in terms of the pressing member. The basic configuration of the present exemplary embodiment is similar to the first exemplary embodiment, and therefore common constituent components will be identified by the same reference numerals as the first exemplary embodiment and this will be substituted for the descriptions thereof.

A pressing member 500 is a member that presses the elastic member 180, and is substantially circular. The camera unit 200 is disposed in the pressing member 500. The pressing member 500 is made from resin. The pressing member 500 is disposed between the base member 160 and the elastic member 180. Further, the pressing member 500 includes a protrusion portion 502 protruding in a direction toward the top cover 120. A plurality of the protrusion portions 502 is provided at even intervals in the circumferential direction. The protrusion portions 502 are disposed so as to be inserted through the protrusion holes 162 of the base member 160 with the top cover 120 removed.

According to the third exemplary embodiment of the present invention, it is also possible to improve the workability of the adjustment of the imaging direction by the user, similarly to the first and second exemplary embodiments. Further, it is possible to provide the network camera 100 capable of preventing a change in the imaging direction of the camera unit due to a vibration.

Variation Example

In the above-described exemplary embodiments of the present invention, the casing is formed by two parts, but may be formed by three or more parts. Further, in the above-described exemplary embodiments of the present invention, the top cover 120 and the bottom cover 140 may be fixed using claw fitting or adhesion as the fixation method therefor.

Further, in the above-described exemplary embodiments of the present invention, the lens protection member 110 may be fixed using adhesion or another component together with another waterproof member as the fixation method therefor. Further, in the above-described exemplary embodiments of the present invention, the control board 300 and the sensor board 240 may be electrically connected using a flexible board, a flat cable, a thin coaxial cable, or a relay board as the connection therebetween.

Further, in the above-described exemplary embodiments of the present invention, the imaging board 240 and the lens holder 230 may be fixed using a screw as the fixation method therefor. Further, in the above-described exemplary embodiments of the present invention, silicon rubber may be used as the elastic member 180.

Further, in the above-described exemplary embodiments of the present invention, the lens cover 210 may be configured to transmit heat of the sensor board to the bottom cover 140 using die cast aluminum or the like. Further, in the above-described exemplary embodiments of the present invention, the inner wall surface may be used for the fitting between the guide portion of the base member 160 and the pressing member 170.

Further, in the above-described exemplary embodiments of the present invention, the pressing member 170 may be made using a resin mold component or a die cast aluminum component. Further, in the above-described exemplary embodiments of the present invention, another component for use of heat dissipation or for a friction adjustment may be provided between the lens cover 210, and the first reception portion 146 and the second reception portion 192.

Figure 7:
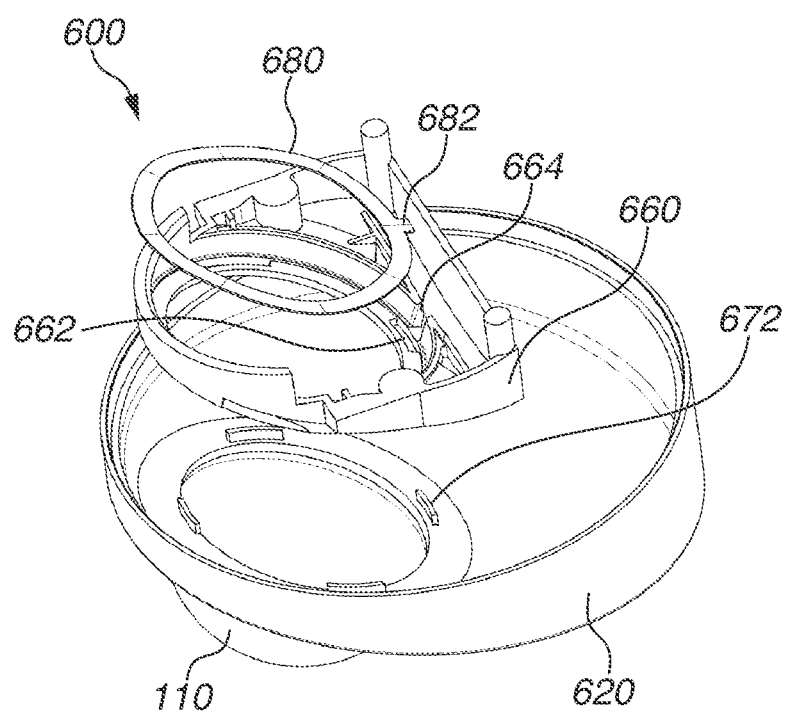
FIG. 7 is an exploded perspective view of an imaging apparatus according to a fourth exemplary embodiment of the present invention.

Next, a fourth exemplary embodiment of the present invention will be described with reference to FIG. 7. The fourth exemplary embodiment is different from the first exemplary embodiment in terms of the shape of the biasing member, and is configured not to use the pressing member. The basic configuration of the present exemplary embodiment is similar to the first exemplary embodiment, and therefore common components will be identified by the same reference numerals as the first exemplary embodiment and this will be substituted for the descriptions thereof. An elastic member 680 according to the fourth exemplary embodiment is made from a wave washer, and includes a plurality of crest portions and trough portions. The elastic member 680 is a member that biases the cover member 190, and is substantially circular. The camera unit 200 is disposed in the elastic member 680. Pressing ribs 672 are formed on the inner side of a top cover 620. Further, protrusion holes 662, through which the pressing ribs 672 are inserted, are formed on a base member 660. The elastic member 680 is disposed between the base member 660 and the cover member 190, and is compressed by being pressed by the base member 660. The pressing ribs 672 directly press the elastic member 680 with the top cover 620 closed. This will be described below. A phase fixation portion 682 is formed on the elastic member 680. On the other hand, the base member 660 includes a cutout portion 664. The phase fixation portion 682 is positioned so as to correspond to the cutout portion 664, and the phase of the crest portions and the trough portions of the elastic member 680 is uniquely determined. Then, the pressing ribs 672 are arranged at positions corresponding to the crest portions of the elastic member 680. Without the phase fixation portion 682 provided, the elastic member 680 would be able to be positioned with a free rotational phase relative to the base member 660. If the trough portions of the elastic member 680 are placed under the pressing ribs 672, the pressing ribs 672 might be unable to reach the elastic member 680 and fail to sufficiently compress the elastic member 680. For this reason, the present exemplary embodiment is configured to provide the phase fixation portion 682, thereby ensuring that the crest portions of the elastic member 680 are placed under the pressing ribs 672.

Figure 8A:
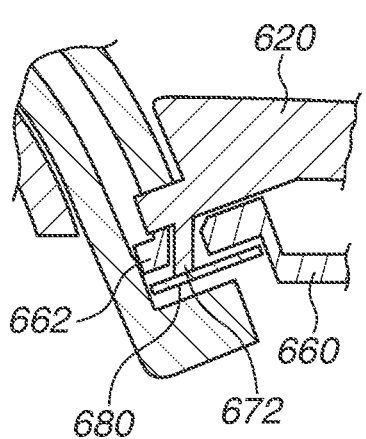
FIGS. 8A and 8B are cross-sectional views illustrating the details of the compression operation of an elastic member according to the fourth exemplary embodiment of the present invention.
Figure 8B:
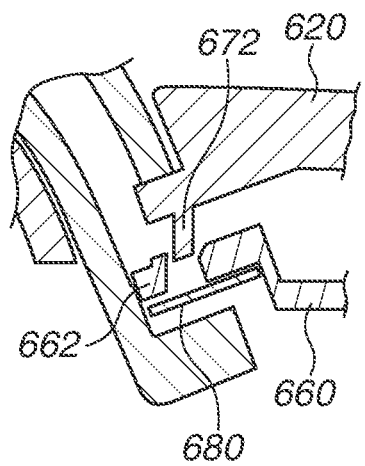

How the camera unit 200 is held will be described in detail. FIGS. 8A and 8B are cross-sectional views illustrating the details of the compression operation of the elastic member 680. FIG. 8A illustrates the compression state of the elastic member 680 with the top cover 620 closed. With the top cover 620 closed, the pressing ribs 672 are inserted through the protrusion holes 662 and press the crest portions of the elastic member 680. At this time, the elastic member 680 is brought into a maximumly compressed state in the elastic deformation region, and also maximizes the holding torque applied to the camera unit 200. The distal end surfaces of the pressing ribs 672 are perpendicular to the pan axis b. Therefore, the elastic member 680 is pressed in the direction at the predetermined angle θ with respect to the direction perpendicular to the installation surface a. With the holding torque maximized, the network camera 100 can prevent the camera unit 200 from being displaced in the pan/tilt/rotation direction and thus prevent a change in the angle of view of imaging even when a vibration or impact is transmitted to the network camera 100.

FIG. 8B illustrates the compression state of the elastic member 680 with the top cover 620 opened. With the top cover 620 opened, the elastic member 680 is brought into a state compressed only by the base member 660. At this time, the compression amount of the elastic member 680 reduces compared to FIG. 8A, and the holding torque applied to the camera unit 200 also reduces. However, the elastic member 680 is fixed in a slightly compressed state, and therefore the holding torque never disappears. Due to this holding torque, the network camera 100 can allow the user to adjust the orientation of the camera unit 200 to an arbitrary orientation while preventing the camera unit 200 from unintentionally moving due to its own weight or the like. Further, the network camera 100 can maintain the angle of view after the user adjusts the orientation of the camera unit 200 to the arbitrary orientation.

In this manner, according to the fourth exemplary embodiment of the present invention, it is possible to improve the workability of the adjustment of the imaging direction by the user at the time of the installation, similarly to the first exemplary embodiment. Further, it is possible to provide the network camera 100 capable of preventing a change in the imaging direction of the camera unit due to a vibration in use.

While the present invention has been described with reference to exemplary embodiments, it is to be understood that the invention is not limited to the disclosed exemplary embodiments. Embodiments are set out in the following statements which, for the avoidance of doubt, form part of the description. The claims follow the description and are labeled as such.

This application claims the benefit of Japanese Patent Applications No. 2020-030784, filed Feb. 26, 2020, and No. 2020-196422, filed Nov. 26, 2020, which are hereby incorporated by reference herein in their entirety.

Statement 1. An imaging apparatus comprising:
a casing including base unit and cover unit;
camera unit disposed on the base unit in the casing;

a camera cover disposed on the base unit in the casing, the camera cover being in contact with and covering the camera unit; and a biasing member configured to bias the camera cover and to be deformed by being pressed by the cover unit when the cover unit is attached to the base unit, wherein a frictional force between the camera unit and the camera cover increases due to an increase in a biasing force applied from the biasing member to the camera cover according to the deformation of the biasing member.

Statement 2. The imaging apparatus according to statement 1, wherein the camera unit is rotatable in at least one of a pan direction and a tilt direction, and wherein the camera unit is held rotatably by the base unit and the camera cover.

Statement 3. The imaging apparatus according to statement 1, wherein the base unit includes a substantially spherical first reception portion holding the camera unit, and the camera cover includes a substantially spherical second reception portion holding the camera unit.

Statement 4. The imaging apparatus according to statement 3, wherein the first reception portion and the second reception portion are in contact with the substantially spherical camera unit on a spherical surface.

Statement 5. The imaging apparatus according to statement 1, wherein the camera unit is rotatable in a pan direction around a pan axis, and wherein the biasing member is pressed by the cover unit in a direction substantially in parallel with the pan axis.

Statement 6. The imaging apparatus according to statement 1, wherein the cover unit presses the biasing member in a direction at a predetermined angle with respect to a direction perpendicular to an installation surface of the casing.

Statement 7. The imaging apparatus according to statement 1, further comprising a holding member including a first cylindrical holding portion rotatably holding the camera cover and a second cylindrical holding portion configured to prevent the camera cover from tilting.

Statement 8. The imaging apparatus according to statement 7, wherein the camera cover includes a flange portion held by the first cylindrical holding portion.

Statement 9. The imaging apparatus according to statement 8, wherein the biasing member is disposed on the flange portion.

Statement 10. The imaging apparatus according to statement 1, wherein the biasing member is substantially circular.

Statement 11. The imaging apparatus according to statement 1, wherein the frictional force between the camera cover and the camera unit after the cover unit is attached to the base unit is greater than the frictional force between the camera cover and the camera unit before the cover unit is attached to the base unit.

Statement 12. The imaging apparatus according to statement 1, wherein the cover unit includes a dome cover.

Statement 13. The imaging apparatus according to statement 1, further comprising a pressing member configured to press the biasing member and contact the cover unit, wherein the biasing member is pressed by the cover unit via the pressing member.

Statement 14. The imaging apparatus according to statement 13, wherein the pressing member includes a protrusion portion in contact with the cover unit.

Statement 15. The imaging apparatus according to statement 13, further comprising a holding member holding the pressing member, wherein the holding member includes a guide portion for movably holding the pressing member, and wherein an outer surface of the pressing member is guided by the guide portion.

Statement 16. The imaging apparatus according to statement 13, wherein the camera unit is rotatable in a pan direction around a pan axis inclined with respect to an installation surface of the imaging apparatus, and the biasing member is pressed by the pressing member in a direction substantially in parallel with the pan axis.

Statement 17. The imaging apparatus according to statement 13, wherein the pressing member is substantially circular.

Statement 18. The imaging apparatus according to statement 1, wherein the cover unit includes a pressing rib configured to press the biasing member.

Statement 19. The imaging apparatus according to statement 18, wherein the biasing member includes a phase fixation portion for determining a rotational phase at the time of attachment.

Statement 20. The imaging apparatus according to statement 19, wherein a holding member includes a cutout portion corresponding to the phase fixation portion.

Statement 21. The imaging apparatus according to statement 18, wherein the biasing member is made from a wave washer, and includes a crest portion and a trough portion.

Statement 22. The imaging apparatus according to statement 21, wherein the pressing rib is disposed so as to press the crest portion of the biasing member.

Statement 23. The imaging apparatus according to statement 18, wherein a distal end of the pressing rib is substantially perpendicular to a pan axis.

What is claimed is:

1. An imaging apparatus comprising:
a casing including a base unit and a cover unit;
a camera unit disposed on the base unit in the casing;
a camera cover disposed on the base unit in the casing, wherein the camera cover is in contact with and covering the camera unit; and
a biasing member configured to bias the camera cover and to be deformed by being pressed by the cover unit when the cover unit is attached to the base unit,
wherein a frictional force between the camera unit and the camera cover increases due to an increase in a biasing force applied from the biasing member to the camera cover according to the deformation of the biasing member,
wherein the camera unit is rotatable in at least one of a pan direction and a tilt direction, and
wherein the camera unit is held rotatably by the base unit and the camera cover.

2. The imaging apparatus according to claim 1, wherein the base unit includes a substantially spherical first reception portion holding the camera unit, and the camera cover includes a substantially spherical second reception portion holding the camera unit.

3. The imaging apparatus according to claim 2, wherein the first reception portion and the second reception portion are in contact with substantially spherical camera unit on a spherical surface.

4. The imaging apparatus according to claim 1,
wherein the camera unit is rotatable in the pan direction around a pan axis, and wherein the biasing member is pressed by the cover unit in a direction substantially in parallel with the pan axis.

5. The imaging apparatus according to claim 1, wherein the cover unit is configured to press the biasing member in a direction at a predetermined angle with respect to a direction perpendicular to an installation surface of the casing.

6. The imaging apparatus according to claim 1, further comprising a holding member including a first cylindrical holding portion rotatably holding the camera cover and a second cylindrical holding portion configured to prevent the camera cover from tilting.

7. The imaging apparatus according to claim 1, wherein the biasing member is substantially circular.

8. The imaging apparatus according to claim 1, wherein the frictional force between the camera cover and the camera unit after the cover unit is attached to the base unit is greater than the frictional force between the camera cover and the camera unit before the cover unit is attached to the base unit.

9. The imaging apparatus according to claim 1, wherein the cover unit includes a dome cover.

10. The imaging apparatus according to claim 1, further comprising a pressing member configured to press the biasing member and contact the cover unit, wherein, in a case where the biasing member is being pressed, the biasing member is pressed by the cover unit via the pressing member.

11. The imaging apparatus according to claim 1, wherein the cover unit includes a pressing rib configured to press the biasing member.

12. The imaging apparatus according to claim 11, wherein the biasing member includes a phase fixation portion for determining a rotational phase at time of attachment.

13. The imaging apparatus according to claim 11, wherein the biasing member is made from a wave washer, and includes a crest portion and a trough portion.

14. The imaging apparatus according to claim 11, wherein a distal end of the pressing rib is substantially perpendicular to a pan axis.

* * * * *